(12) United States Patent
Yoeli

(10) Patent No.: US 7,789,342 B2
(45) Date of Patent: *Sep. 7, 2010

(54) VEHICLES PARTICULARLY USEFUL AS VTOL VEHICLES

(75) Inventor: Rafi Yoeli, Tel-Aviv (IL)

(73) Assignee: Urban Aeronautics, Ltd., Yavne (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/826,202

(22) Filed: Jul. 12, 2007

(65) Prior Publication Data

US 2008/0142643 A1    Jun. 19, 2008

Related U.S. Application Data

(63) Continuation of application No. 11/061,652, filed on Feb. 22, 2005, now Pat. No. 7,246,769, which is a continuation of application No. 10/479,618, filed as application No. PCT/IL02/00439 on Jun. 4, 2002, now Pat. No. 6,883,748.

(60) Provisional application No. 60/295,005, filed on Jun. 4, 2001.

(51) Int. Cl.
*B64C 29/00* (2006.01)

(52) U.S. Cl. .................................... 244/23 B; 244/12.3

(58) Field of Classification Search .................. None
See application file for complete search history.

(56) References Cited

U.S. PATENT DOCUMENTS

| 1,287,076 | A | 12/1918 | Moses |
| 2,077,471 | A | 4/1937 | Fink |
| 2,138,999 | A | 12/1938 | Clark |
| 2,242,201 | A | 5/1941 | Woods |
| 2,273,724 | A | 2/1942 | Nelson et al. |
| D155,004 | S | 8/1949 | Gluhareff |
| 2,709,947 | A | 6/1955 | Woods |
| 2,734,705 | A | 2/1956 | Robertson |
| 2,777,649 | A | 1/1957 | Williams |
| 2,812,636 | A | 11/1957 | Kadosch et al. |
| 2,899,149 | A | 8/1959 | Breguet |
| 2,930,544 | A | 3/1960 | Howell |

(Continued)

FOREIGN PATENT DOCUMENTS

EP    0 236583    9/1987

(Continued)

OTHER PUBLICATIONS

Edward D. Flinn, "Revolutionary X-Hawk Hovers Near Success," Aerospace America, Jul. 2003, pp. 26-28.

(Continued)

*Primary Examiner*—Timothy D Collins
(74) *Attorney, Agent, or Firm*—Nixon & Vanderhye P.C.

(57) ABSTRACT

A vehicle including a fuselage, at least one lift-producing propeller carried by the fuselage on each side of its transverse axis a pilot's compartment formed in the fuselage between the lift-producing propellers and substantially aligned with the longitudinal axis, and a pair of payload bays formed in the fuselage between the lift-producing propellers and on opposite sides of the pilot's compartment. Many variations are described enabling the vehicle to be used not only as a VTOL vehicle, but also as a multi-function utility vehicle for performing many diverse functions including hovercraft and ATV functions.

18 Claims, 12 Drawing Sheets

U.S. PATENT DOCUMENTS

| | | |
|---|---|---|
| 2,936,969 A | 5/1960 | Griffith et al. |
| 2,939,649 A | 6/1960 | Shaw |
| 2,951,661 A | 9/1960 | Dorman et al. |
| 2,955,780 A | 10/1960 | Hulbert |
| 2,968,453 A | 1/1961 | Bright |
| 2,973,921 A | 3/1961 | Price |
| 2,975,676 A | 3/1961 | Butler |
| 2,988,301 A | 6/1961 | Fletcher |
| 3,033,493 A | 5/1962 | Wilde et al. |
| 3,039,537 A | 6/1962 | Heidelberg |
| 3,082,977 A | 3/1963 | Arlin |
| 3,088,695 A | 5/1963 | Clark |
| 3,090,581 A | 5/1963 | Einarsson |
| 3,116,898 A | 1/1964 | Clark et al. |
| 3,136,500 A | 6/1964 | Kerry |
| 3,161,374 A | 12/1964 | Allred et al. |
| 3,174,573 A | 3/1965 | Chaplin |
| 3,179,353 A | 4/1965 | Peterson |
| 3,181,810 A | 5/1965 | Olson |
| 3,184,183 A | 5/1965 | Piasecki |
| 3,187,817 A | 6/1965 | Colley |
| 3,198,082 A | 8/1965 | Kerris |
| 3,201,067 A | 8/1965 | Meyerhoff |
| 3,203,645 A | 8/1965 | Shaw |
| 3,223,354 A | 12/1965 | Seibold et al. |
| 3,224,712 A | 12/1965 | Taylor et al. |
| 3,231,221 A | 1/1966 | Platt |
| 3,244,246 A | 4/1966 | Weiland |
| 3,262,511 A | 7/1966 | Carr |
| 3,262,657 A | 7/1966 | Anker-Holth |
| 3,265,329 A | 8/1966 | Postelson-Apostolescu |
| 3,276,528 A | 10/1966 | Tucknott et al. |
| 3,289,977 A | 12/1966 | Staats |
| 3,384,327 A | 5/1968 | Postelson-Apostolesc |
| 3,397,852 A | 8/1968 | Katzen |
| 3,397,854 A | 8/1968 | Reyle |
| 3,454,238 A | 7/1969 | Goodson |
| 3,463,420 A | 8/1969 | Butler et al. |
| 3,481,559 A | 12/1969 | Apostolescu |
| 3,519,224 A | 7/1970 | Boyd et al. |
| 3,559,921 A | 2/1971 | Timperman |
| 3,580,530 A | 5/1971 | Wada |
| 3,606,208 A | 9/1971 | Postelson-Apostolescu |
| 3,614,030 A | 10/1971 | Moller |
| 3,627,235 A | 12/1971 | Lippisch |
| 3,665,809 A | 5/1972 | Darlington et al. |
| 3,752,417 A | 8/1973 | Lagace |
| 3,827,527 A | 8/1974 | Bertelsen |
| 3,873,049 A | 3/1975 | Horsdal |
| 3,904,155 A | 9/1975 | Chavis |
| 3,912,201 A | 10/1975 | Bradbury |
| 3,955,780 A | 5/1976 | Postelson |
| 3,972,490 A | 8/1976 | Zimmermann et al. |
| 4,022,405 A | 5/1977 | Peterson |
| 4,043,421 A | 8/1977 | Smith |
| 4,149,688 A | 4/1979 | Miller, Jr. |
| 4,194,707 A | 3/1980 | Sharpe |
| 4,469,294 A | 9/1984 | Clifton |
| 4,505,442 A | 3/1985 | Kirsch et al. |
| 4,505,443 A | 3/1985 | Bradfield et al. |
| 4,537,372 A | 8/1985 | Forizs |
| 4,598,890 A | 7/1986 | Herzog et al. |
| 4,701,602 A | 10/1987 | Schaefer et al. |
| 4,754,940 A | 7/1988 | Deter |
| 4,757,962 A | 7/1988 | Grant |
| 4,765,568 A | 8/1988 | Carl et al. |
| 4,795,111 A | 1/1989 | Moller |
| 4,796,836 A | 1/1989 | Buchelt |
| 4,824,048 A | 4/1989 | Kim |
| 4,834,319 A | 5/1989 | Ewy et al. |
| 4,880,071 A | 11/1989 | Tracy |
| 4,892,274 A | 1/1990 | Pohl et al. |
| 4,934,629 A | 6/1990 | Brant |
| 5,064,143 A | 11/1991 | Bucher |
| 5,101,927 A | 4/1992 | Murtuza |
| 5,419,514 A | 5/1995 | Ducan |
| 5,454,531 A | 10/1995 | Melkuti |
| 5,505,407 A | 4/1996 | Chiappetta |
| 5,666,483 A | 9/1997 | McClary |
| 5,738,302 A | 4/1998 | Freeland |
| 5,746,390 A | 5/1998 | Chiappetta et al. |
| 5,806,805 A | 9/1998 | Elbert et al. |
| 5,890,441 A | 4/1999 | Swinson et al. |
| 6,089,501 A | 7/2000 | Frost |
| 6,105,901 A | 8/2000 | Ulanoski et al. |
| 6,119,985 A | 9/2000 | Clapp et al. |
| 6,170,778 B1 | 1/2001 | Cycon et al. |
| 6,254,032 B1 | 7/2001 | Bucher |
| 6,270,038 B1 | 8/2001 | Cycon et al. |
| 6,318,668 B1 | 11/2001 | Ulanoski et al. |
| 6,371,406 B1 | 4/2002 | Corcoran |
| 6,382,559 B1 | 5/2002 | Sutterfield et al. |
| 6,431,494 B1 | 8/2002 | Kinkead et al. |
| 6,446,911 B1 | 9/2002 | Yount et al. |
| 6,457,670 B1 | 10/2002 | Geranio |
| 6,464,166 B1 | 10/2002 | Yoeli |
| 6,474,598 B2 | 11/2002 | Carter, Jr. |
| 6,520,449 B2 | 2/2003 | Illingworth |
| 6,568,630 B2 | 5/2003 | Yoeli |
| 6,616,094 B2 | 9/2003 | Illingworth |
| 6,644,598 B2 | 11/2003 | Glezer et al. |
| 6,704,624 B2 | 3/2004 | Ortega et al. |
| 6,708,920 B2 | 3/2004 | Fukuyama |
| 6,745,977 B1 | 6/2004 | Long et al. |
| 6,751,530 B2 | 6/2004 | Seifert et al. |
| D496,606 S | 9/2004 | Sanders, Jr. |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,883,748 B2 | 4/2005 | Yoeli |
| 6,886,776 B2 | 5/2005 | Wagner et al. |
| 6,892,979 B2 | 5/2005 | Milde |
| 6,892,980 B2 | 5/2005 | Kawai |
| 6,913,226 B2 | 7/2005 | Huynh |
| 6,926,322 B2 | 8/2005 | Browne et al. |
| 6,974,105 B2 | 12/2005 | Pham |
| 7,246,769 B2 | 7/2007 | Yoeli |
| 7,267,300 B2 | 9/2007 | Heath et al. |
| 7,275,712 B2 | 10/2007 | Yoeli |
| 2002/0161488 A1 | 10/2002 | Guillemin et al. |
| 2003/0038213 A1 | 2/2003 | Yoeli |
| 2003/0062442 A1 | 4/2003 | Milde, Jr. |
| 2003/0062443 A1 | 4/2003 | Wagner et al. |
| 2003/0085319 A1 | 5/2003 | Wagner et al. |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2004/0149857 A1 | 8/2004 | Yoeli |
| 2004/0155143 A1 | 8/2004 | Yoeli |
| 2005/0029407 A1 | 2/2005 | Pohl et al. |
| 2005/0040283 A1 | 2/2005 | Frazer |
| 2005/0065669 A1 | 3/2005 | Roux et al. |
| 2005/0178881 A1 | 8/2005 | Yoeli |
| 2005/0242231 A1 | 11/2005 | Yoeli |
| 2006/0113426 A1 | 6/2006 | Yoeli |
| 2006/0231675 A1 | 10/2006 | Bostan |
| 2007/0034734 A1 | 2/2007 | Yoeli |
| 2007/0034739 A1 | 2/2007 | Yoeli |
| 2007/0095971 A1 | 5/2007 | Yoeli |
| 2008/0054121 A1 | 3/2008 | Yoeli |
| 2008/0283673 A1 | 11/2008 | Yoeli |

| | | | |
|---|---|---|---|
| 2009/0084907 | A1 | 4/2009 | Yoeli |
| 2009/0140102 | A1 | 6/2009 | Yoeli |
| 2009/0159757 | A1 | 6/2009 | Yoeli |

FOREIGN PATENT DOCUMENTS

| | | |
|---|---|---|
| EP | 0 922925 | 6/1999 |
| GB | 935884 A | 9/1963 |
| GB | 951186 A | 3/1964 |
| IT | 666076 | 8/1964 |
| IT | 666076 A | 8/1964 |
| SE | 184314 | 6/1963 |
| WO | WO 01/93039 A1 | 12/2001 |
| WO | WO 02/096750 A2 | 12/2002 |
| WO | WO 02/098732 A2 | 12/2002 |
| WO | WO 03/016134 A1 | 2/2003 |
| WO | WO 2004/012993 A1 | 2/2004 |
| WO | WO 2004/031876 A1 | 4/2004 |
| WO | WO 2005/039972 A2 | 5/2005 |
| WO | WO 2006/072960 A2 | 7/2006 |
| WO | WO 2006/131920 | 12/2006 |
| WO | WO 2007/052271 A2 | 5/2007 |
| WO | WO 2007/099543 A2 | 9/2007 |
| WO | WO 2007/129313 A2 | 11/2007 |
| WO | WO 2008/065654 A2 | 6/2008 |
| WO | WO 2008/065664 A2 | 6/2008 |
| WO | 2008/135973 A2 | 11/2008 |
| WO | WO 2009/077968 A2 | 6/2009 |

OTHER PUBLICATIONS

Raymond L. Robb, "Driving On Air: 20th Century Flying Carpets," Vertiflite, vol. 51, No. 1, Spring 2005, pp. 2-11.
Urban Aeronautics Ltd., "The X-Hawk VTOL Utility Vehicle"—product description and specifications, 2004.
Piasecki Aircraft Corporation Product Description and History for Piasecki VZ-8 VTOL research vehicle (undated).
International Search Report for International Application No. PCT/IL02/00417 (now WO 02/096750 (Yoeli)), dated May 23, 2003, published Oct. 2, 2003.
Written Opinion in International Application No. PCT/IL02/00417 (now WO 02/096750 (Yoeli)), Aug. 19, 2003.
International Preliminary Examination Report for International Application No. PCT/IL02/00417 (now WO 02/096750 (Yoeli)), Oct. 20, 2003.
Corrected International Preliminary Examination Report for International Application No. PCT/IL02/00417 (now WO 02/096750 (Yoeli)), Jul. 25, 2004.
International Search Report for International Application No. PCT/IL02/000439 (now WO 2002/098732 (Yoeli)), dated Apr. 28, 2003, published Mar. 18, 2004.
International Preliminary Examination Report in International Application No. PCT/IL02/000439 (now WO 2002/098732 (Yoeli)), Jul. 26, 2004.
International Search Report for International Application No. PCT/IL02/00682 (now WO 03/016134 (Yoeli)), dated Dec. 6, 2002.
International Search Report for International Application No. PCT/IL03/00640 (now WO 2004/012993 (Yoeli)), dated Jan. 2, 2004.
International Search Report for International Application No. PCT/IL03/00786 (now WO 2004/031876 (Yoeli)), Feb. 9, 2004.
International Search Report for International Application No. PCT/IL04/00984 (now WO 2005/039972 (Yoeli)), dated Dec. 6, 2005, published Jan. 26, 2006.
Written Opinion of the International Searching Authority in International Application No. PCT/IL04/00984 (now WO 2005/039972 (Yoeli)), dated Dec. 6, 2005.
International Preliminary Report on Patentability in International Application No. PCT/IL04/00984 (now WO 2005/039972 (Yoeli)), dated May 1, 2006.
Copending U.S. Appl. No. 10/987,321 (Yoeli), filed at the U.S. Patent Office Nov. 15, 2004.
Copending U.S. Appl. No. 10/523,609 (Yoeli), filed at the U.S. Patent Office Feb. 7, 2005 (International Application date Aug. 5, 2003).
Copending U.S. Appl. No. 11/411,243 (Yoeli), filed at the U.S. Patent Office Apr. 26, 2006 (International Application date Oct. 27, 2004).
Copending U.S. Appl. No. 11/447,311 (Yoeli), filed at the U.S. Patent Office Jun. 6, 2006.
Copending U.S. Appl. No. 11/405,003 (Yoeli), filed at the U.S. Patent Office Apr. 17, 2006.
De Lorean DMC-12, alleged to have first been produced in 1981 (images available from Wikipedia, the free encyclopedia, at http://en.wikipedia.org/wiki/De_Lorean_DMC-12).
International Search Report for International Application No. PCT/IL06/01264 (now WO 2007/052271 A2) (Yoeli) dated Aug. 5, 2008.
Written Opinion of the International Searching Authority in International Application No. PCT/IL06/01264 (now WO 2007/052271 A2) (Yoeli) dated Aug. 5, 2008.
International Search Report for International Application No. PCT/IL07/00544 (now WO 2007/129313) (Yoeli) dated Jul. 7, 2008.
Written Opinion of the International Searching Authority in International Application No. PCT/IL07/00544 (now WO 2007/129313) (Yoeli) dated Jul. 7, 2008.
Co-Pending U.S. Appl. No. 11/794,906 (Yoeli), filed at the U.S. Patent Office Jul. 9, 2007.
Co-Pending U.S. Appl. No. 11/798,187 (Yoeli), filed at the U.S. Patent Office May 10, 2007.
Co-Pending U.S. Appl. No. 11/892,414 (Yoeli), filed at the U.S. Patent Office Aug. 22, 2007.
Written Opinion of the International Searching Authority in International application No. PCT/IL006/00032 (Yoeli) dated Sep. 11, 2006.
International Preliminary Report on Patentability in International Application No. PCT/IL06/00032 (Yoeli), dated Sep. 11, 2006.
U.S. Appl. No. 11/061,652 (Yoeli), filed Feb. 22, 2005.
International Search Report for International Application No. PCT/IL06/00663 (now WO 2006/131920) (Yoeli) dated Dec. 19, 2006.
Written Opinion of the International Searching Authority in International Application No. PCT/IL06/00663 (Yoeli) dated Dec. 19, 2006.
English Abstract of Italian Patent No. 666076, dated Aug. 1964.
U.S. Appl. No. 12/224,549 (Yoeli), filed Nov. 4, 2008.
U.S. Appl. No. 12/226,952 (Yoeli), filed Feb. 27, 2009.
Written Opinion and Search Report of the International Searching Authority in International Application No. PCT/IL07/00271 (now WO 2007/099543 A2) (Yoeli), dated Oct. 28, 2008.
Written Opinion and Search Report of the International Searching Authority in International Application No. PCT/IL07/01475 (now WO 2008/065664 A2) (Yoeli), dated Sep. 2, 2008.
International Search Report for International Application No. PCT/IL0701465 (now WO 2008/065654) (Yoeli) dated Sep. 30, 2008.
Written Opinion of the International Searching Authority in International Application No. PCT/IL0701465 (now WO 2008/065654) (Yoeli) dated Sep. 30, 2008.
International Search Report for International Application No. PCT/IL08/00575 (now WO 2008/135973) (Yoeli) dated Oct. 28, 2008.
Written Opinion of the International Searching Authority in International Application No. PCT/IL08/00575 (now WO 2008/135973) (Yoeli) dated Oct. 28, 2008.
U.S. Appl. No. 12/516,257 (Yoeli), filed May 26, 2009.
U.S. Appl. No. 12/516,743 (Yoeli), filed May 28, 2009.
Corrected Written Opinion and Search Report of the International Searching Authority in International Application No. PCT/IL07/01475 (now WO 2008/065664 A2) (Yoeli) dated Jul. 27, 2009.
Written Opinion and International Search Report of the International Searching Authority in International Application No. PCT/IB08/055301 (now WO 2009/077968 A2) (Yoeli) dated Aug. 14, 2009.
Written Opinion and International Search Report of the International Searching Authority in International Application No. PCT/IB09/052346 (Yoeli) dated Oct. 20, 2009.

VEHICLES PARTICULARLY USEFUL AS VTOL VEHICLES

CROSS-REFERENCE TO RELATED APPLICATIONS

This application is a continuation of U.S. patent application Ser. No. 11/061,652, filed Feb. 25, 2005, now U.S. Pat. No. 7,246,769 which is a continuation of U.S. patent application Ser. No. 10/479,618, filed Dec. 4, 2003, now U.S. Pat. No. 6,883,748 which is a U.S. National Phase Application under 35 U.S.C. 371 of PCT International Application No. PCT/IL02/00439, which has an international filing date of Jun. 4, 2002, and which claims priority from U.S. Patent Application No. 60/295,005, filed Jun. 4, 2001.

FIELD AND BACKGROUND OF THE INVENTION

The present invention relates to vehicles, and particularly to Vertical Take-Off and Landing (VTOL) vehicles having multi-function capabilities.

VTOL vehicles rely on direct thrust from propellers or rotors, directed downwardly, for obtaining lift necessary to support the vehicle in the air. Many different types of VTOL vehicles have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on a multitude of propellers that are either exposed (e.g., unducted fans), or installed inside circular cavities, shrouds, ducts or other types of nacelle (e.g., ducted fans), where the flow of air takes place inside ducts. Some VTOL vehicles (such as the V-22) use propellers having their axes of rotation fully rotatable (up to 90 degrees or so) with respect to the body of the vehicle; these vehicles normally have the propeller axis perpendicular to the ground for vertical takeoff and landing, and then tilt the propeller axis forward for normal flight. Other vehicles use propellers having nearly horizontal axes, but include aerodynamic deflectors installed behind the propeller which deflect all or part of the flow downwardly to create direct upward lift.

A number of VTOL vehicles have been proposed in the past where two or four propellers, usually mounted inside ducts (i.e., ducted fans), were placed forwardly of, and rearwardly of, the main payload of the vehicle. One typical example is the Piasecki VZ-8 'Flying Jeep' which had two large ducts, with the pilots located to the sides of the vehicle, in the central area between the ducts. A similar configuration was used on the Chrysler VZ-6 and on the CityHawk flying car. Also the Bensen 'Flying Bench' uses a similar arrangement. The Curtiss Wright VZ-7 and the Moller Skycar use four, instead of two, thrusters where two are located on each side (forward and rear) of the pilots and the payload, the latter being of fixed nature at the center of the vehicle, close to the vehicle's center of gravity.

The foregoing existing vehicles are generally designed for specific functions and are therefore not conveniently capable of performing a multiplicity of functions.

OBJECTS AND BRIEF SUMMARY OF THE INVENTION

An object of the present invention is to provide a vehicle of a relatively simple inexpensive construction and yet capable of performing a multiplicity of different functions.

According to the present invention, there is provided a vehicle, comprising: a fuselage having a longitudinal axis and a transverse axis; at least one lift-producing propeller carried by the fuselage on each side of the transverse axis; a pilot's compartment formed in the fuselage between the lift-producing propellers and substantially aligned with the longitudinal axis; and a pair of payload bays formed in the fuselage between the lift-producing propellers and on opposite sides of the pilot's compartment.

According to further features in the preferred embodiments of the invention described below, each of the payload bays includes a cover deployable to an open position providing access to the payload bay, and to a closed position covering the payload bay. In some described preferred embodiments, the cover of each of the payload bays is pivotally mounted to the fuselage along an axis parallel to the longitudinal axis of the fuselage at the bottom of the respective payload bay, such that when the cover is pivoted to the open position it also serves as a support for supporting the payload or a part thereof in the respective payload bay.

Various embodiments of the invention are described below, wherein the lift propellers are ducted or unducted fans, and wherein the fuselage carries a pair of the lift producing propellers on each side of the transverse axis, a vertical stabilizer at the rear end of the fuselage, or a horizontal stabilizer at the rear end of the fuselage.

Several preferred embodiments are also described below wherein the fuselage further carries a pair of pusher propellers at the rear end of the fuselage, on opposite sides of the longitudinal axis. In the described embodiments, the fuselage carries two engines, each for driving one of the lift-producing propellers and pusher propellers with the two engines being mechanically coupled together in a common transmission. In one described preferred embodiment, the two engines are located in engine compartments in pylons formed in the fuselage on opposite sides of its longitudinal axis. In another described embodiment, the two engines are located in a common engine compartment aligned with the longitudinal axis of the fuselage and underlying the pilot's compartment.

One preferred embodiment is described wherein the vehicle is a vertical take-off and landing (VTOL) vehicle and includes a pair of stub wings each pivotally mounted under one of the payload bays to a retracted, stored position, and to an extended, deployed position for enhancing lift. Another embodiment is described wherein the vehicle includes a flexible skirt extending below the fuselage enabling the vehicle to be used as, or converted to, a hovercraft for movement over ground or water. A further embodiment is described wherein the vehicle includes large wheels attachable to the rear end of the fuselage for converting the vehicle to an all terrain vehicle (ATV).

As will be described more particularly below, a vehicle constructed in accordance with the foregoing features may be of a relatively simple and inexpensive construction capable of conveniently performing a host of different functions besides the normal functions of a VTOL vehicle. Thus, the foregoing features enable the vehicle to be constructed as a utility vehicle for a large array of tasks including serving as a weapons platform; transporting personnel, weapons, and/or cargo; evacuating medically wounded, etc., without requiring major changes in the basic structure of the vehicle when transferring from one task to another.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

As indicated earlier, the present invention provides a vehicle of a novel construction which permits it to be used for a large variety of tasks and missions with no changes, or minimum changes, required when converting from one mission to another.

Figure 1:
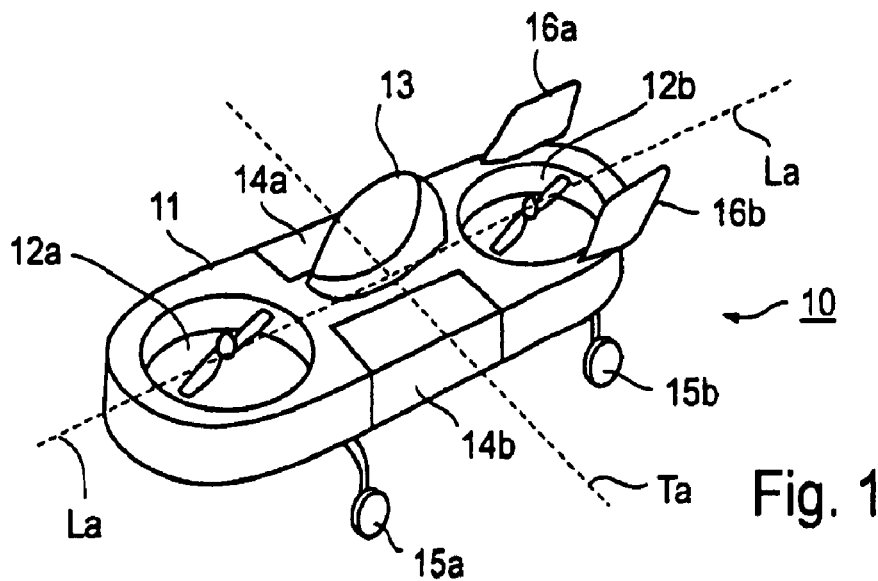
FIG. 1 illustrates one form of VTOL vehicle constructed in accordance with present invention with two ducted fans.

The basic construction of such a vehicle is illustrated in FIG. 1, and is therein generally designated 10. It includes a fuselage 11 having a longitudinal axis LA and a transverse axis TA. Vehicle 10 further includes two lift-producing propellers 12a, 12b carried at the opposite ends of the fuselage 11 along its longitudinal axis LA and on opposite sides of its transverse axis TA. Lift-producing propellers 12a, 12b are ducted fan propulsion units extending vertically through the fuselage and rotatable about vertical axes to propel the air downwardly and thereby to produce an upward lift.

Vehicle 10 further includes a pilot's compartment 13 formed in the fuselage 11 between the lift-producing propellers 12a, 12 and substantially aligned with the longitudinal axis LA and transverse axis TA of the fuselage. The pilot's compartment 13 may be dimensioned so as to accommodate a single pilot or two (or more) pilots, as shown, for example, in FIG. 6a.

Vehicle 10 illustrated in FIG. 1 further includes a pair of payload bays 14a, 14b formed in the fuselage 11 laterally on the opposite sides of the pilot's compartment 13 and between the lift-producing propellers 12a, 12b. The payload bays 14a, 14b shown in FIG. 1 are substantially flush with the fuselage 11, as will be described more particularly below with respect to FIGS. 6a-6c and the pictorial illustration in FIGS. 8a-8d. Also described below, particularly with respect to the pictorial illustrations of FIGS. 8a-8d, are the wide variety of tasks and missions capable of being accomplished by the vehicle when constructed as illustrated in FIG. 1 (and in the later illustrations), and particularly when provided with the payload bays corresponding to 14a, 14b of FIG. 1.

Vehicle 10 illustrated in FIG. 1 further includes a front landing gear 15a and a rear landing gear 15b mounted at the opposite ends of its fuselage 11. In FIG. 1 the landing gears are non-retractable, but could be retractable as in later described embodiments. Aerodynamic stabilizing surfaces may also be provided, if desired, as shown by the vertical stabilizers 16a, 16b carried at the rear end of fuselage 11 on the opposite sides of its longitudinal axis LA.

Figure 2:
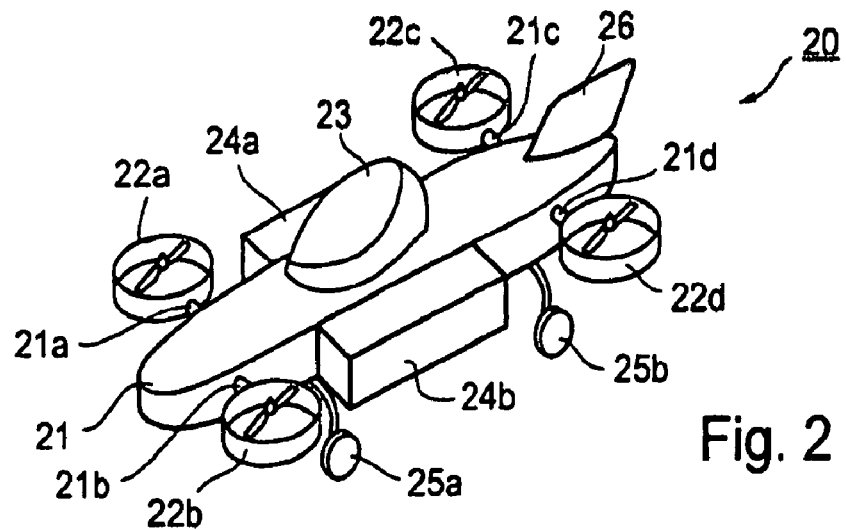
FIG. 2 illustrates an alternative construction with four ducted fans.

FIG. 2 illustrates another vehicle construction in accordance with the present invention. In the vehicle of FIG. 2, therein generally designated 20, the fuselage 21 is provided with a pair of lift-producing propellers on each side of the transverse axis of the fuselage. Thus, as shown in FIG. 2, the vehicle includes a pair of lift-producing propellers 22a, 22b at the front end of the fuselage 21, and another pair of lift-producing propellers 22c, 22d at the rear end of the fuselage. The lift-producing propellers 22a-22d shown in FIG. 2 are also ducted fan propulsion units. However, instead of being formed in the fuselage 21, they are mounted on mounting structures 21a-21d to project laterally of the fuselage.

Vehicle 20 illustrated in FIG. 2 also includes the pilot's compartment 23 formed in the fuselage 21 between the two pairs of lift-producing propellers 22a, 22b and 22c, 22d, respectively. As in the case of the pilot's compartment 13 in FIG. 1, the pilot's compartment 23 in FIG. 2 is also substantially aligned with the longitudinal axis LA and transverse axis TA of the fuselage 21.

Vehicle 20 illustrated in FIG. 2 further includes a pair of payload bays 24a, 24b formed in the fuselage 21 laterally of the pilot's compartment 23 and between the two pairs of lift-producing propellers 22a-22d. In FIG. 2, however, the payload bays are not formed integral with the fuselage, as in FIG. 1, but rather are attached to the fuselage so as to project laterally on opposite sides of the fuselage. Thus, payload bay 24a is substantially aligned with the lift-producing propellers 22a, 22c on that side of the fuselage; and payload bay 24b is substantially aligned with the lift-producing propellers 22b and 22d at that side of the fuselage.

Vehicle 20 illustrated in FIG. 2 also includes a front landing gear 25a and a rear landing gear 25b, but only a single vertical stabilizer 26 at the rear end of the fuselage aligned with its longitudinal axis. It will be appreciated however, that vehicle 20 illustrated in FIG. 2 could also include a pair of vertical stabilizers, as shown at 16a and 16b in FIG. 1, or could be constructed without any such aerodynamic stabilizing surface.

Figure 3:
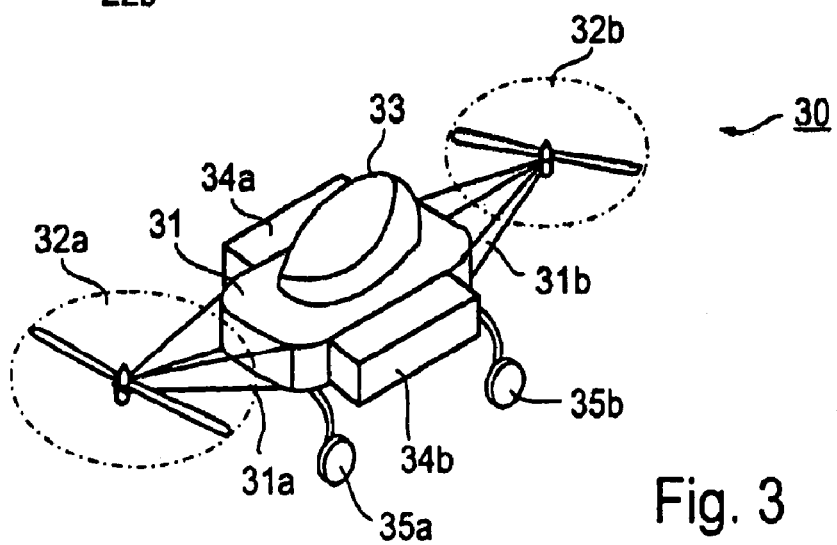
FIG. 3 illustrates a construction similar to FIG. 1 with free propellers, i.e., unducted fans.

FIG. 3 illustrates a vehicle 30 also including a fuselage 31 of a very simple construction having a forward mounting structure 31a for mounting the forward lift-producing propeller 32a, and a rear mounting structure 31b for mounting the rear lift-producing propeller 32b. Both propellers are unducted, i.e., free, propellers. Fuselage 31 is formed centrally thereof with a pilots compartment 33 and carries the two payload bays 34a, 34b on its opposite sides laterally of the pilot's compartment.

Vehicle 30 illustrated in FIG. 3 also includes a front landing gear 35a and a rear landing gear 35b, but for simplification purposes, it does not include an aerodynamic stabilizing surface corresponding to vertical stabilizers 16a, 16b in FIG. 1.

Figure 4:
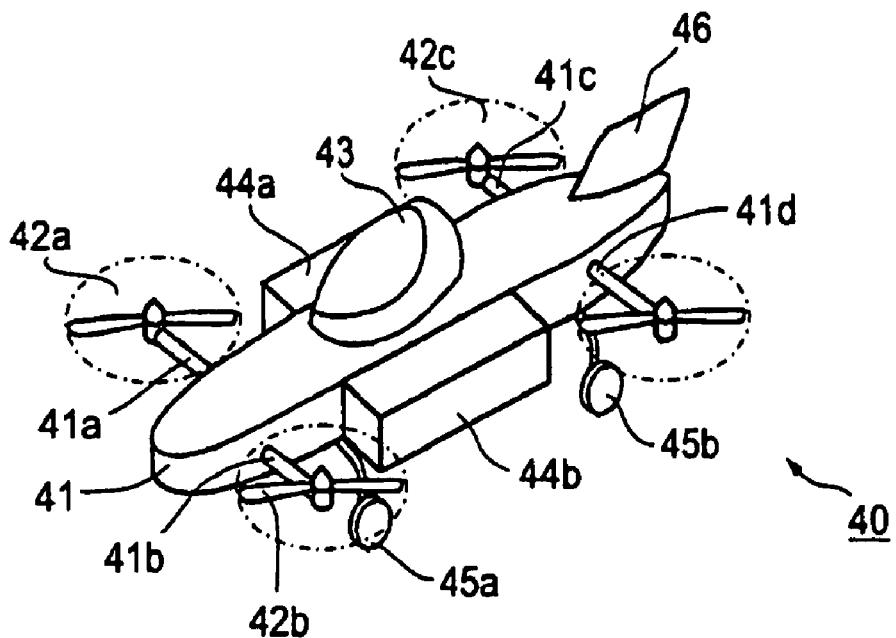
FIG. 4 illustrates a construction similar to FIG. 2 with free propellers.

FIG. 4 illustrates a vehicle, generally designated 40, of a similar construction as in FIG. 2 but including a fuselage 41 mounting a pair of unducted propellers 42a, 42b at its front end, and a pair of unducted propellers 42c, 42d at its rear end by means of mounting structures 41a-41d, respectively. Vehicle 40 further includes a pilot's compartment 43 centrally of the fuselage, a pair of payload bays 44a, 44b laterally of the pilot's compartment, a front landing gear 45a, a rear landing gear 45b, and a vertical stabilizer 46 at the rear end of the fuselage 41 in alignment with its longitudinal axis.

Figure 5:
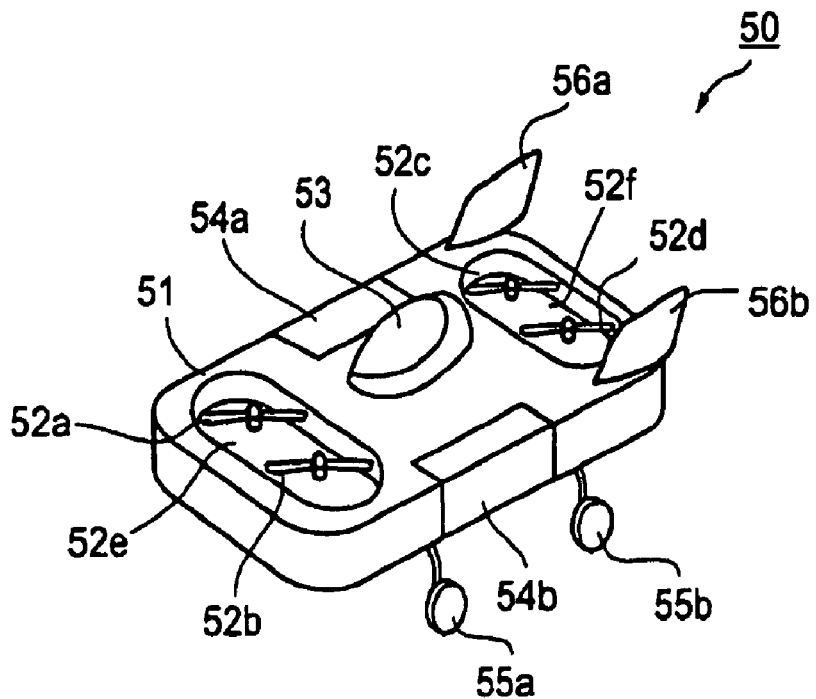
FIG. 5 illustrates a construction similar to that of FIG. 1 but including two propellers, instead of a single propeller, mounted side-by-side in a single, oval shaped duct at each end of the vehicle.

FIG. 5 illustrates a vehicle, generally designated 50, including a fuselage 51 mounting a pair of lift-producing propellers 52a, 52b at its front end, and another pair 52c, 52d at its rear end. Each pair of lift-producing propellers 52a, 52b and 52c, 52d is enclosed within a common oval-shaped duct 52e, 52f at the respective end of the fuselage.

Vehicle 50 illustrated in FIG. 5 further includes a pilot' compartment 53 formed centrally of the fuselage 51, a pair of payload bays 54a, 54b laterally of the pilot's compartment 53, a front landing gear 55a, a rear landing gear 55b, and vertical stabilizers 56a, 56b carried at the rear end of the fuselage 51.

Figure 6A:
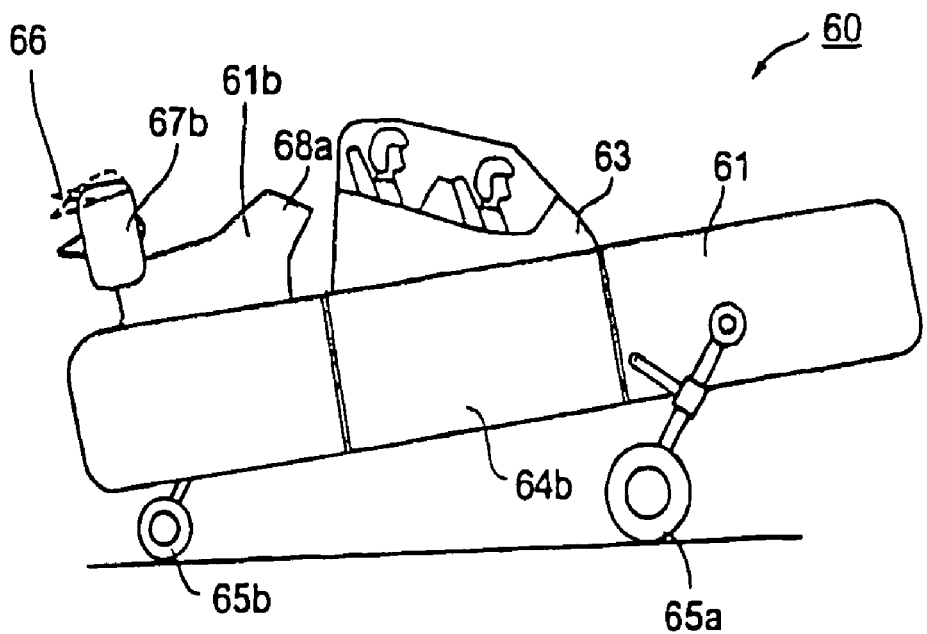
FIGS. 6a, 6b and 6c are side, top and rear views, respectively, illustrating another VTOL vehicle constructed in accordance with the present invention and including pusher propellers in addition to the lift-producing propellers.
Figure 6B:
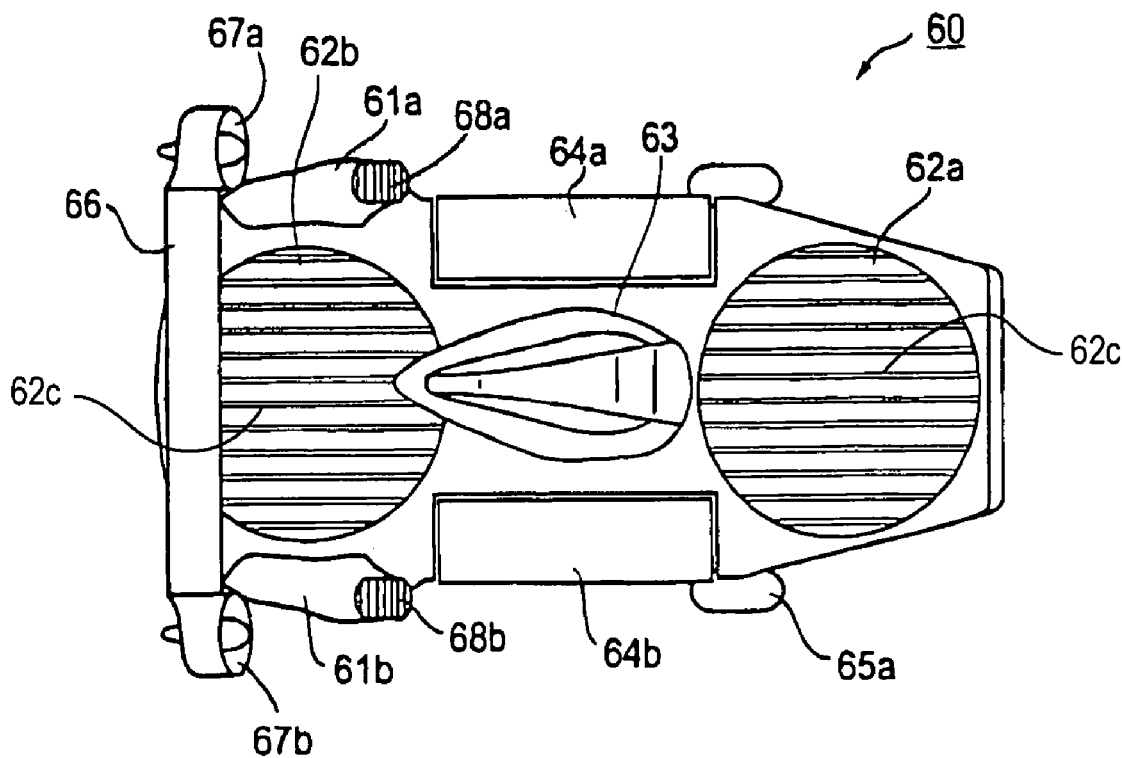
Figure 6C:
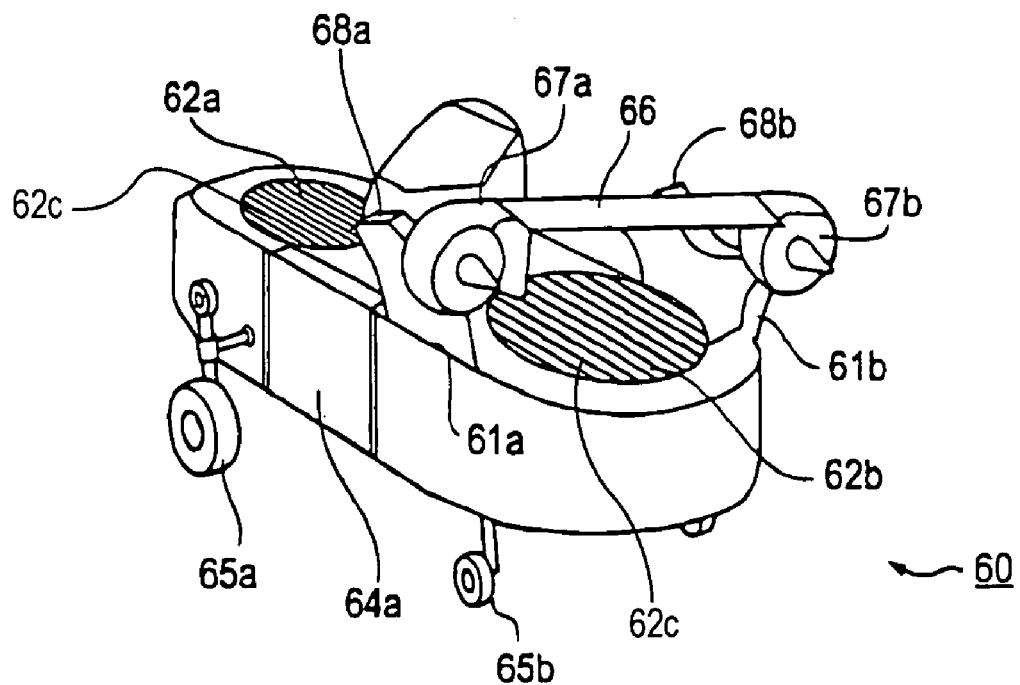

FIGS. 6a, 6b and 6c are side, top and rear views, respectively, of another vehicle constructed in accordance with the present invention. The vehicle illustrated in FIGS. 6a-6c, therein generally designated 60, also includes a fuselage 61 mounting a lift-producing propeller 62a, 62b at its front and rear ends, respectively. The latter propellers are preferably ducted units as in FIG. 1, with vanes 62c extending across the inlet side of the duct, substantially parallel to the longitudinal axis of the vehicle.

Vehicle 60 further includes a pilot's compartment 63 centrally of the fuselage 61, a pair of payload bays 64a, 64b laterally of the fuselage and of the pilot's compartment, a front landing gear 65a, a rear landing gear 65b, and a stabilizer 66, which, in this case, is a horizontal stabilizer 66 extending across the rear end of the fuselage 61.

Vehicle 60 illustrated in FIGS. 6a-6c further includes a pair of pusher propellers 67a, 67b, mounted at the rear end of the fuselage 61 at the opposite ends of the horizontal stabilizer 66. As shown particularly in FIG. 6c the rear end of the fuselage 61 is formed with a pair of pylons 61a, 61b, for mounting the two pusher propellers 67a, 67b, together with the horizontal stabilizer 66.

The two pusher propellers 67a, 67b are preferably variable-pitch propellers enabling the vehicle to attain higher horizontal speeds. The horizontal stabilizer 66 is used to trim the vehicle's pitching moment caused by the ducted fans 62a, 62b, thereby enabling the vehicle to remain horizontal during high speed flight.

Each of the pusher propellers 67a, 67b is driven by an engine enclosed within the respective pylon 61a, 61b. The two engines are preferably turbo-shaft engines. Each pylon is thus formed with an air inlet 68a, 68b at the forward end of the respective pylon, and with an air outlet (not shown) at the rear end of the respective pylon.

Figure 7:
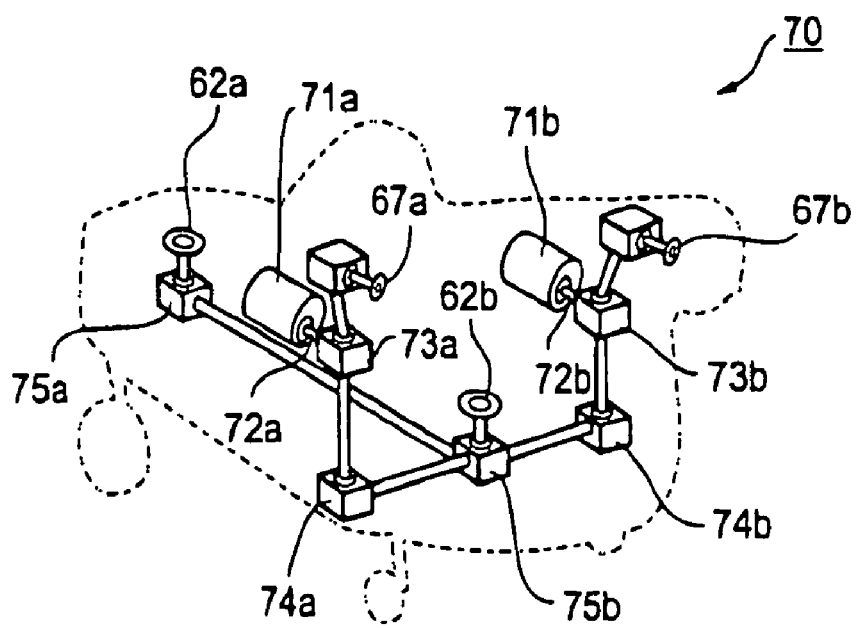
FIG. 7 is a diagram illustrating the drive system in the vehicle of FIGS. 6a-6c.

FIG. 7 schematically illustrates the drive within the vehicle 60 for driving the two ducted fans 62a, 62b (only the top of the gearbox of each ducted fan being shown), as well as the pusher propellers 67a, 67b. The drive system, generally designated 70, includes two engines 71, 71b, each incorporated in an engine compartment within one of the two pylons 61a, 61b. Each engine 71a, 71b, is coupled by an over-running clutch 72a, 72b, to a gear box 73a, 73b coupled on one side to the respective thrust propeller 67a, 67b, and on the opposite side to a transmission for coupling to the two ducted fans 62a, 62b at the opposite ends of the fuselage. Thus, as schematically shown in FIG. 7, the latter transmission includes additional gear boxes 74a, 74b coupled to rear gear box 75b for driving the rear ducted fan 62b, and front gear box 75a for driving the front ducted fan 62b.

Figure 8:
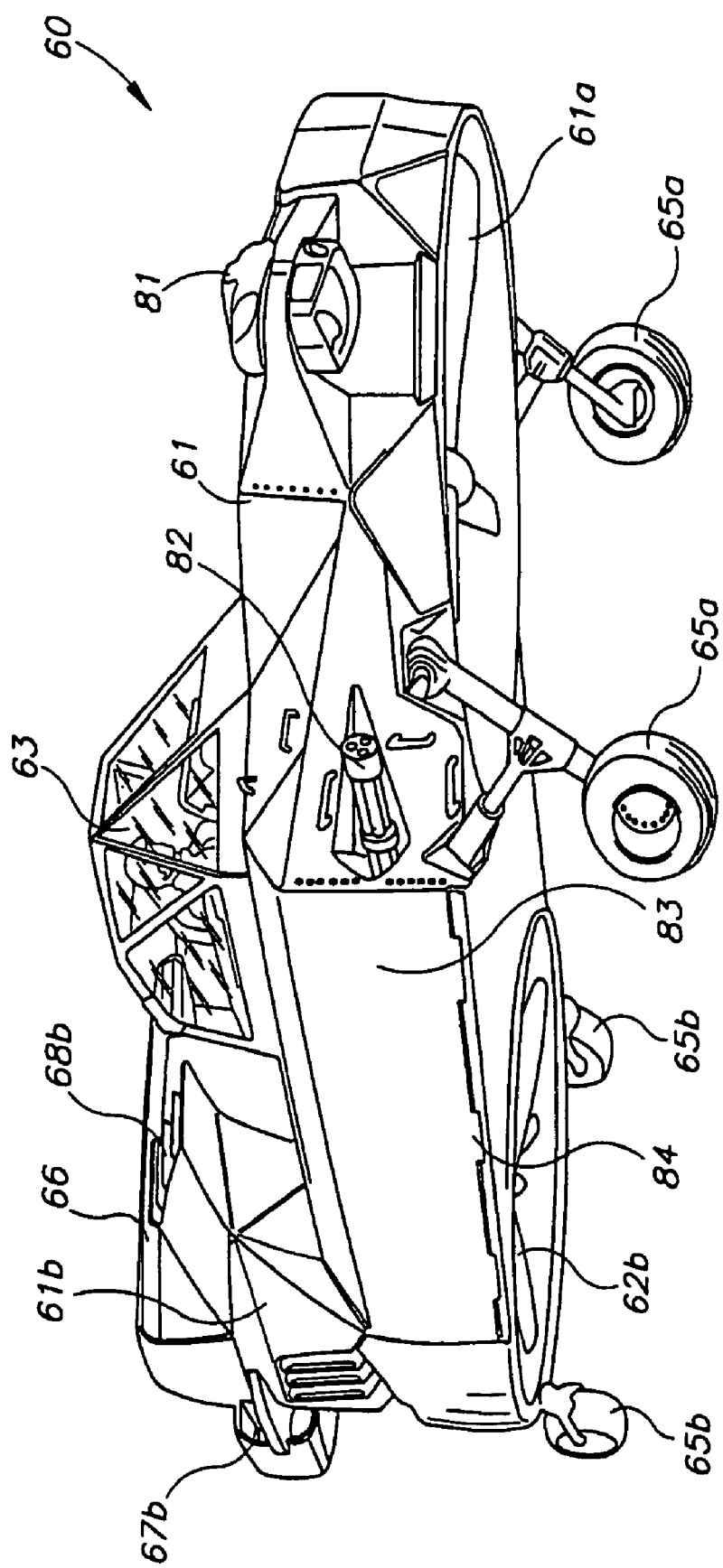
FIG. 8 is a pictorial illustration of a vehicle constructed in accordance with FIGS. 6a-6c and 7.

FIG. 8 pictorially illustrates an example of the outer appearance that vehicle 60 may take.

In the pictorial illustration of FIG. 8, those parts of the vehicle which correspond to the above-described parts in FIGS. 6a-6c are identified by the same reference numerals in order to facilitate understanding. FIG. 8, however, illustrates a number of additional features which may be provided in such a vehicle.

Thus, as shown in FIG. 8, the front end of the fuselage 61 may be provided with a stabilized sight and FLIR (Forward Looking Infra-Red) unit, as shown at 81, and with a gun at the forward end of each payload bay, as shown at 82. In addition, each payload bay may include a cover 83 deployable to an open position providing access to the payload bay, and to a closed position covering the payload bay with respect to the fuselage 61.

In FIG. 8, cover 83 of each payload bay is pivotally mounted to the fuselage 61 along an axis 84 parallel to the longitudinal axis of the fuselage at the bottom of the respective bay. The cover 83, when in its closed condition, conforms to the outer surface of the fuselage 61 and is flush therewith. When the cover 83 is pivoted to its open position, it serves as a support for supporting the payload, or a part thereof, in the respective payload bay.

Figure 8A:
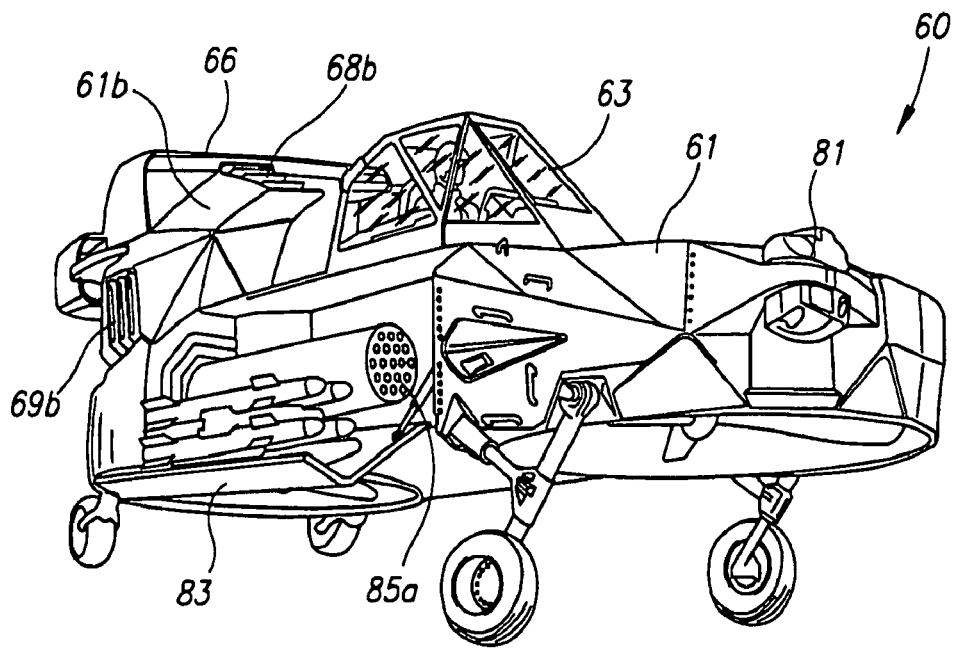
FIG. 8a-8d illustrate examples of various tasks and missions capable of being accomplished by the vehicle of FIG. 8.
Figure 8B:
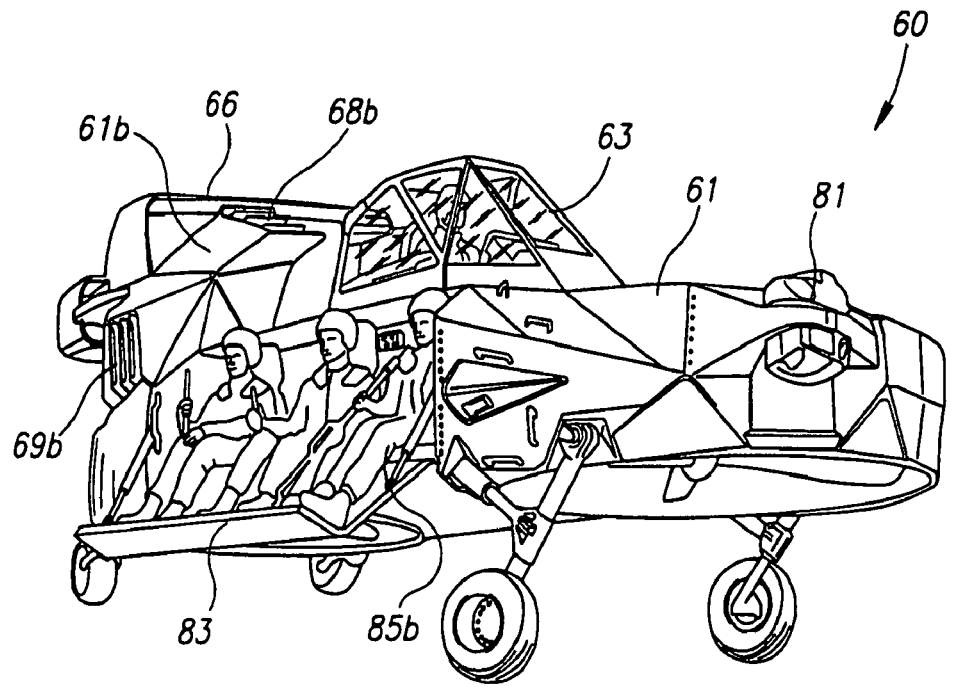
Figure 8C:
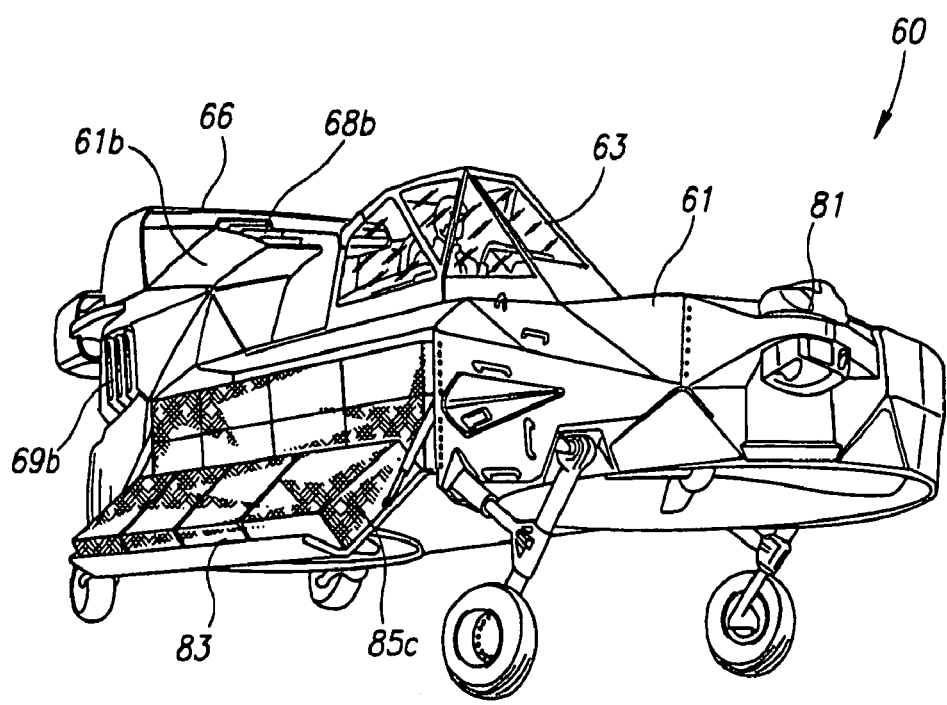
Figure 8D:
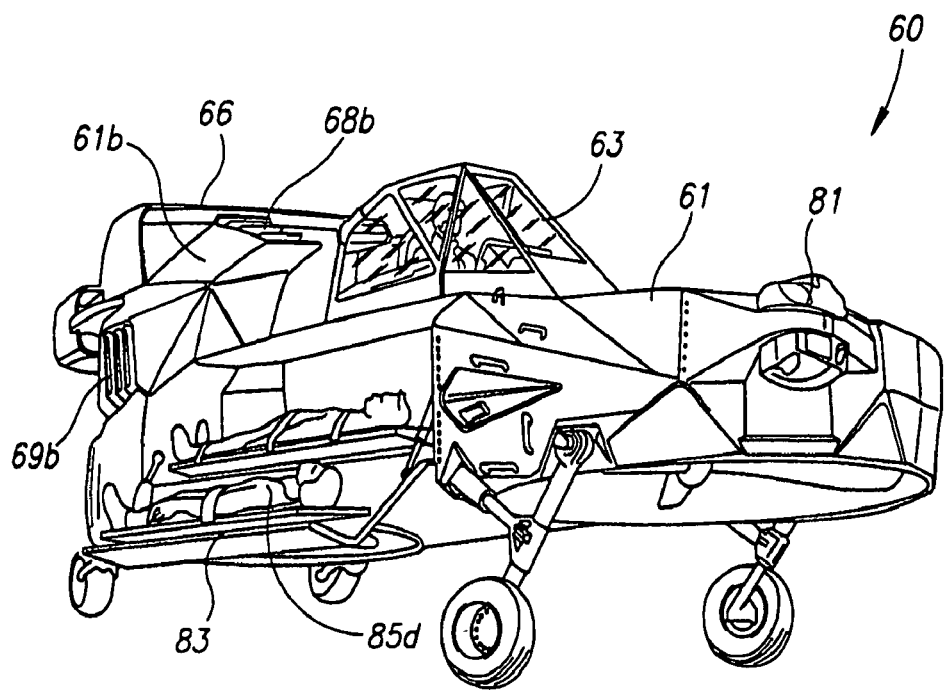

The latter feature is more particularly shown in FIGS. 8a-8d which illustrate various task capabilities of the vehicle as particularly enabled by the pivotal covers 83 for the two payload bays. Thus, FIG. 8a illustrates the payload bays used for mounting or transporting guns or ammunition 85a; FIG. 8b illustrates the use of the payload bays for transporting personnel or troops 85b; FIG. 8c illustrates the use of the payload bays for transporting cargo 85c; and FIG. 8d illustrates the use of the payload bays for evacuating wounded 85d. Many other task or mission capabilities will be apparent.

Figure 9A:
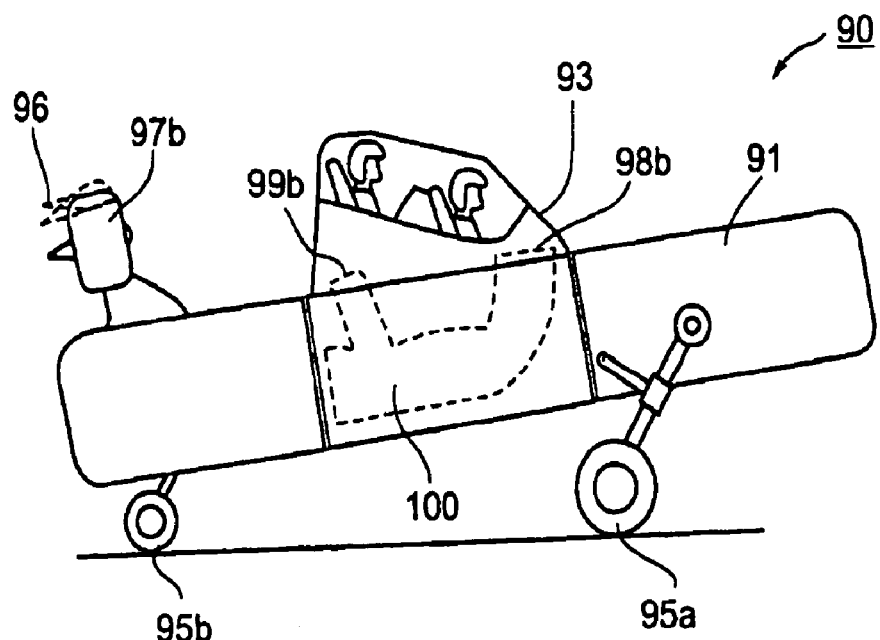
FIGS. 9a and 9b are side and top views, respectively, illustrating another VTOL vehicle constructed in accordance with the present invention.
Figure 9B:
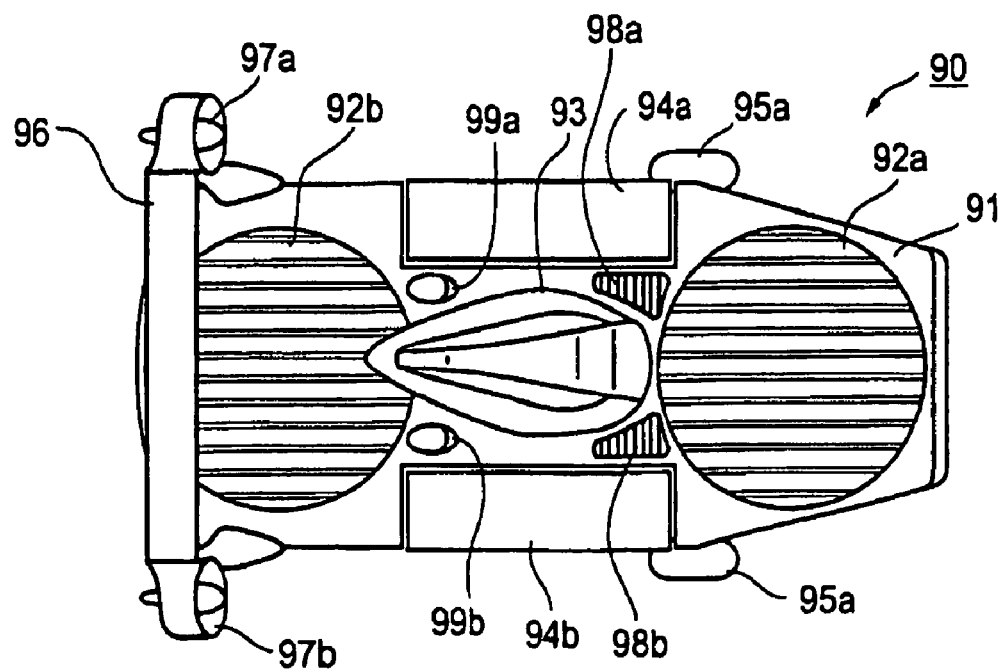

FIGS. 9a and 9b are side and top views, respectively, illustrating another vehicle, generally designated 90, of a slightly modified construction from vehicle 60 described above.

Thus, vehicle 90 illustrated in FIGS. 9a and 9b also includes a fuselage 91, a pair of ducted-fan type lift-producing propellers 92a, 92b at the opposite ends of the fuselage, a pilot's compartment 93 centrally of the fuselage, and a pair of payload bays 94a, 94b laterally of the pilot's compartment 93. Vehicle 90 further includes a front landing gear 95a, a rear landing gear 95b, a horizontal stabilizer 96, and a pair of pusher propellers 97a, 97b, at the rear end of fuselage 91.

Figure 10:
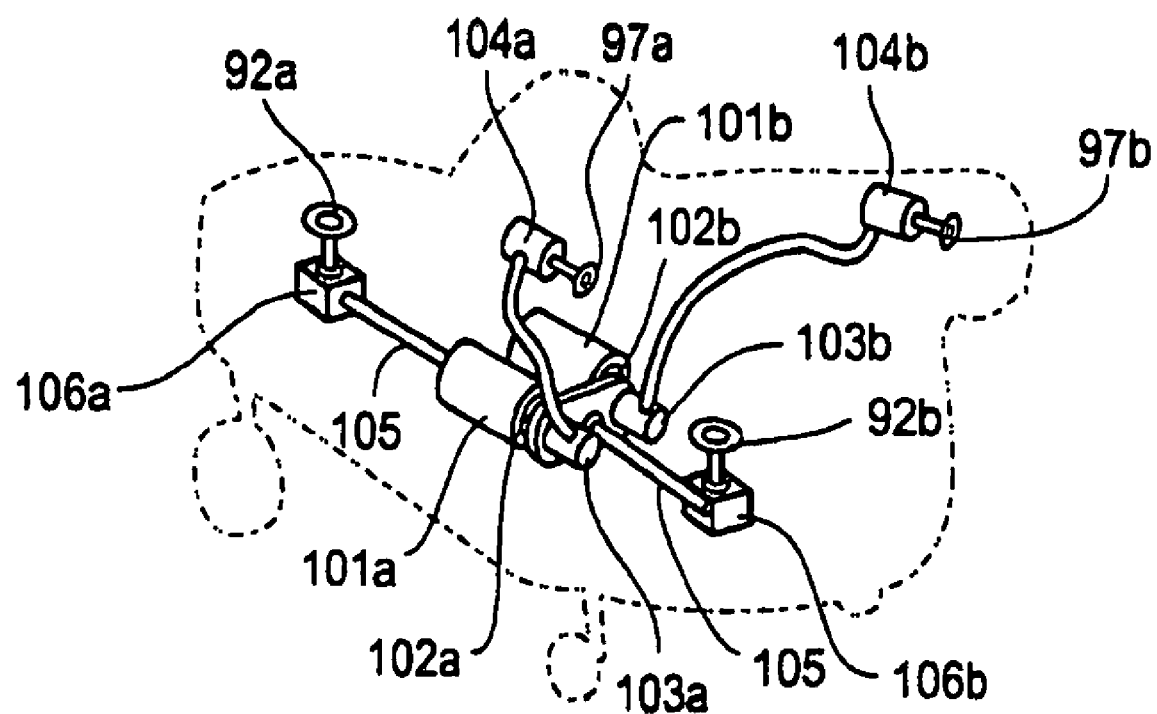
FIG. 10 is a diagram illustrating the drive system in the vehicle of FIGS. 9a and 9b.

FIG. 10 schematically illustrates the drive system in vehicle 90. Thus as shown in FIG. 10, vehicle 90 also includes two engines 101a, 101b for driving the two ducted fans 92a, 92b and the two pusher propellers 97a, 97b, respectively, as in vehicle 60. However, whereas in vehicle 60 the two engines are located in separate engine compartments in the two pylons 61a, 61b, in vehicle 90 illustrated in FIGS. 9a and 9b both engines are incorporated in a common engine compartment, schematically shown at 100 in FIG. 9a, underlying the pilot's compartment 93. The two engines 101a, 101b (FIG. 10), may also be turbo-shaft engines as in FIG. 7. For this purpose, the central portion of the fuselage 91 is formed with a pair of air inlet openings 98a, 98b forward of the pilot's compartment 93, and with a pair of air outlet openings 99a, 99b rearwardly of the pilot's compartment.

As shown in FIG. 10, the two engines 101a, 101b drive, via the over-running clutches 102a, 102b, a pair of hydraulic pumps 103a, 103b which, in turn, drive the drives 104a, 104b of the two pusher propellers 97a, 97b. The two engines 101a, 101b are further coupled to a drive shaft 105 which drives the drives 106a, 106b of the two ducted fans 92a, 92b, respectively.

Figure 11A:
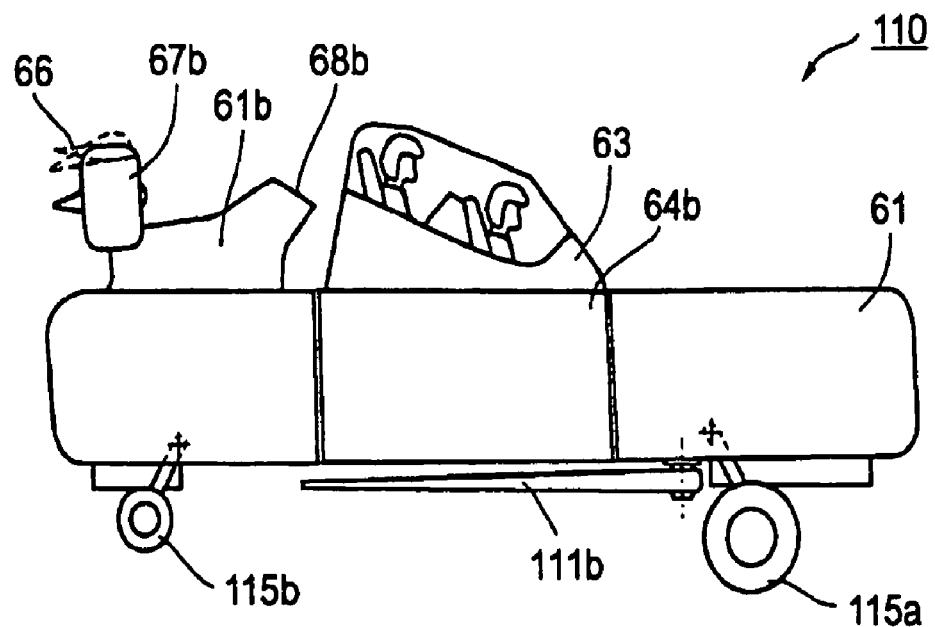
FIGS. 11a and 11b are side and top views, respectively, illustrating a VTOL vehicle constructed in accordance with any one of FIGS. 6a-10 but equipped with deployable stub wings, the wings being shown in these figures in their retracted stowed positions.
Figure 11B:
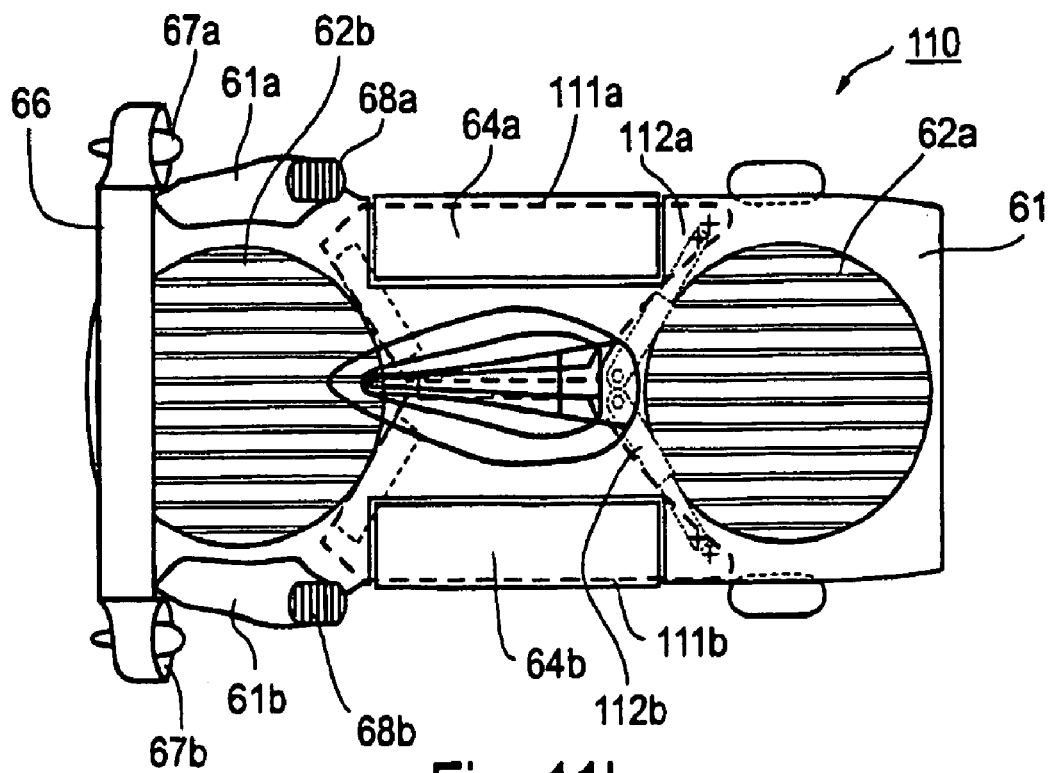
Figure 11C:
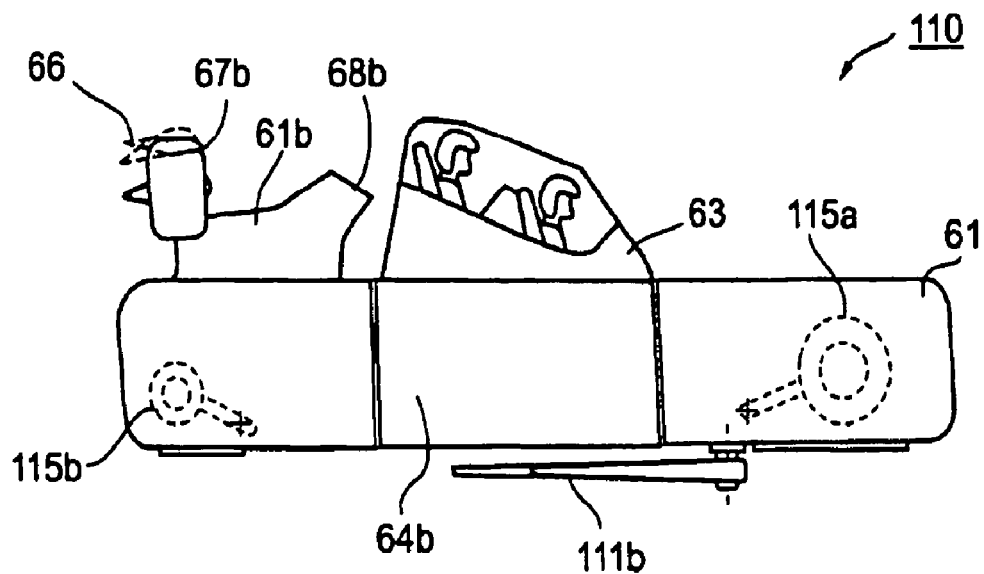
FIGS. 11c and 11d are views corresponding to those of FIGS. 11a and 11b but showing the stub wings in their deployed, extended positions.
Figure 11D:
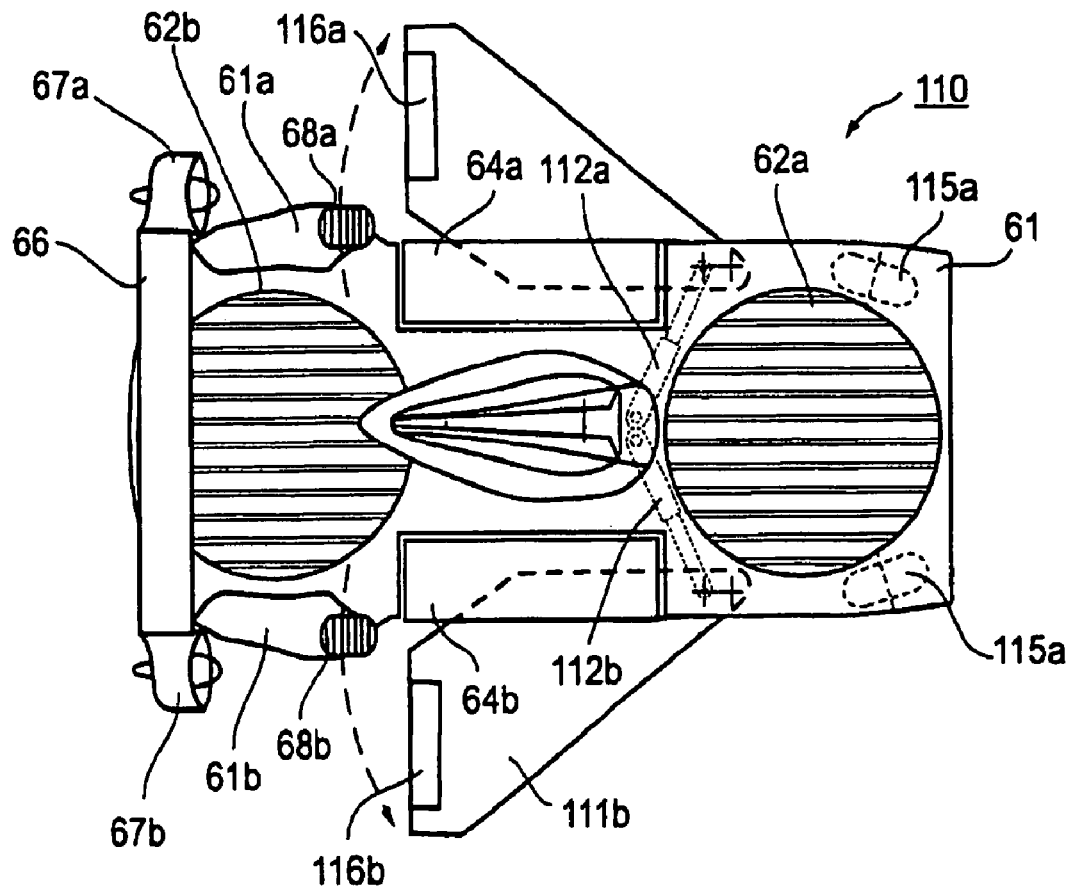

FIGS. 11a-11d illustrate another vehicle, therein generally designated 110, which is basically of the same construction as vehicle 60 described above with respect to FIGS. 6a-6c, 7, 8 and 8a-8d; to facilitate understanding, corresponding elements are therefore identified by the same reference numerals. Vehicle 110 illustrated in FIGS. 11a-11d, however, is equipped with two stub wings, generally designated 111a, 111b, each pivotally mounted to the fuselage 61, under one of the payload bays 64a, 64b, to a retracted position shown in FIGS. 11a and 11b, or to an extended deployed position shown in FIGS. 11c and 11d for enhancing the lift produced by the ducted fans 62a, 62b. Each of the stub wings 111a, 111b is actuated by an actuator 112a, 112b driven by a hydraulic or electrical motor (not shown). Thus, at low speed flight, the stub wings 111a, 111b, would be pivoted to their stowed positions as shown in FIGS. 11a and 11b; but at high speed flight, they could be pivoted to their extended or deployed positions, as shown in FIGS. 11c and 11d, to enhance the lift produced by the ducted fans 61a, 61b. Consequently, the blades in the ducted fans would be at low pitch producing only a part of the total lift force.

The front and rear landing gear, shown at 115a and 115b, could also by pivoted to a stowed position to enable higher speed flight, as shown in FIGS. 11c and 11d. In such case, the front end of the fuselage 61 would preferably be enlarged to accommodate the landing gear when in its retracted condition. Vehicle 110 illustrated in FIGS. 11a-11d may also include ailerons, as shown at 116a, 116b (FIG. 11d) for roll control.

Figure 12:
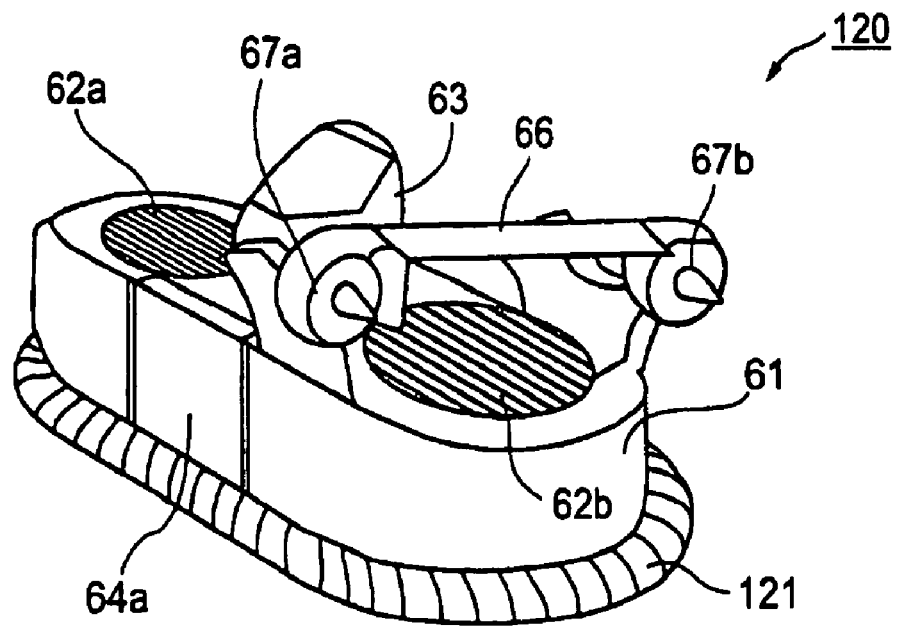
FIG. 12 is a perspective rear view of a vehicle constructed in accordance with any one of FIGS. 6a-10 but equipped with a lower skirt for converting the vehicle to a hovercraft for movement over ground or water.

FIG. 12 illustrates how the vehicle, such as vehicle 60 illustrated in FIGS. 6a-6d, may be converted to a hovercraft for traveling over ground or water. Thus, the vehicle illustrated in FIG. 12, and therein generally designated 120, is basically of the same construction as described above with respect to FIGS. 6a-6d, and therefore corresponding parts have been identified with the same reference numerals. In vehicle 120 illustrated in FIG. 12, however, the landing gear wheels (65a, 65b, FIGS. 6a-6d) have been removed, folded, or otherwise stowed, and instead, a skirt 121 has been applied around the lower end of the fuselage 61. The ducted fans 62a, 62b, may be operated at very low power to create enough pressure to cause the vehicle to hover over the ground or water as in hovercraft vehicles. The variable pitch pusher propellers 67a, 67b would provide forward or rear movement, as well as steering control, by individually varying the pitch, as desired, of each propeller.

Vehicles constructed in accordance with the present invention may also be used for movement on the ground. Thus, the front and rear wheels of the landing gears can be driven by electric or hydraulic motors included within the vehicle.

Figure 13:
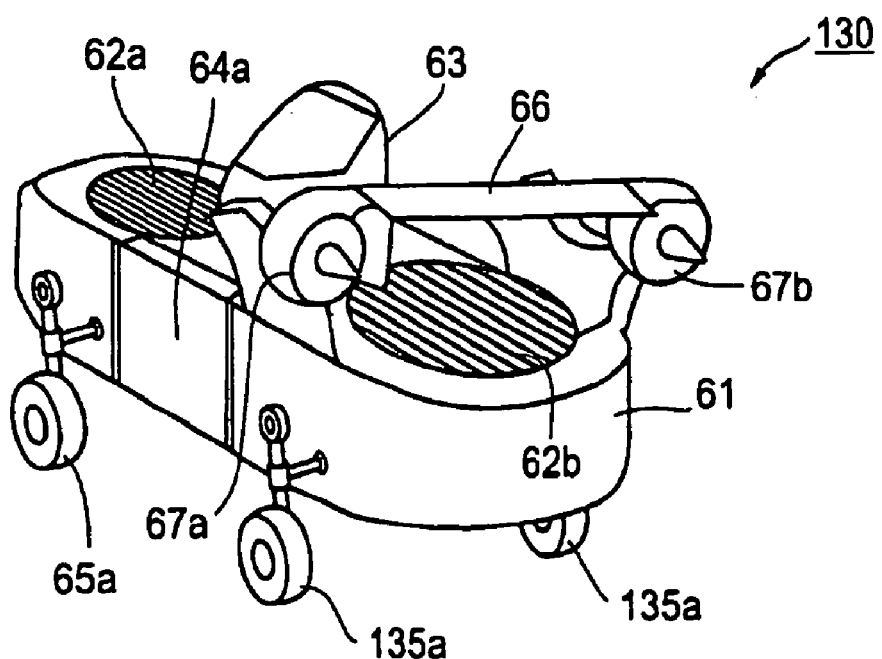
FIG. 13 is a perspective rear view of a vehicle constructed in accordance with any one of FIGS. 6a-10 but equipped with large wheels for converting the vehicle for ATV (all terrain vehicle) operation.

FIG. 13 illustrates how such a vehicle can also be used as an ATV (all terrain vehicle). The vehicle illustrated in FIG. 13, therein generally designated 130, is basically of the same construction as vehicle 60 illustrated in FIGS. 6a-6d, and therefore corresponding parts have been identified by the same reference numerals to facilitate understanding. In vehicle 130 illustrated in FIG. 13, however, the two rear wheels of the vehicle are replaced by two (or four) larger ones, bringing the total number of wheels per vehicle to four (or six). Thus, as shown in FIG. 13, the front wheels (e.g., 65a, FIG. 6c) of the front landing gear are retained, but the rear wheels are replaced by two larger wheels 135a (or by an additional pair of wheels, not shown), to enable the vehicle to traverse all types of terrain.

When the vehicle is used as an ATV as shown in FIG. 13, the front wheels 65a or rear wheels would provide steering, while the pusher propellers 67a, 67b and main lift fans 62a, 62b would be disconnected but could still be powered-up for take-off if so desired.

It will thus be seen that the invention thus provides a utility vehicle of a relatively simple structure which is capable of performing a wide variety of VTOL functions, as well as many other tasks and missions, with minimum changes in the vehicle to convert it from one task or mission to another.

While the invention has been described with respect to several preferred embodiments, it will be appreciated that these are set forth merely for purposes of example, and that many other variations, modifications and applications of the invention will be apparent.

The invention claimed is:

1. A vehicle comprising:
    a fuselage having a longitudinal axis and a transverse axis wherein said fuselage includes a pair of thrust-producing propellers at the rear end of said fuselage on opposite sides of said longitudinal axis, said pair of thrust-producing propellers supported above said fuselage on a pair of pylons extending upwardly from said fuselage;
    at least two lift-producing propellers carried within said fuselage respectively on each side of said transverse axis;
    a compartment formed in said fuselage between said lift-producing propellers; and
    at least two engines, each capable of driving said pair of thrust-producing propellers and said lift-producing propellers.

2. The vehicle of claim 1 wherein said thrust producing propellers are located at opposite ends of a horizontal stabilizer, said horizontal stabilizer adjustable about a horizontal axis.

3. The vehicle according to claim 1 wherein said two engines are located in engine compartments within said pylons.

4. The vehicle according to claim 1 wherein said two engines are located in a common engine compartment aligned with said longitudinal axis and underlying said compartment.

5. The vehicle according to claim 1 wherein the vehicle includes a flexible skirt extending below the fuselage enabling the vehicle to be used as a hovercraft for movement over ground or water.

6. The vehicle according to claim 1 wherein the vehicle includes a plurality of wheels attachable to the rear end of said fuselage for converting the vehicle to an all-terrain vehicle.

7. The vehicle according to claim 1 wherein a plurality of vanes extend across an inlet side of each lift producing propeller.

8. The vehicle according to claim 7 wherein said plurality of vanes extend substantially parallel to said longitudinal axis.

9. The vehicle according to claim 1 wherein said fuselage carries landing gear moveable between extended and retracted positions.

10. A vehicle, comprising:
   a fuselage having a longitudinal axis and a transverse axis;
   at least one lift-producing propeller carried by said fuselage on each side of said transverse axis;
   a compartment formed in said fuselage between said lift-producing propellers;
   at least one payload bay formed in said fuselage between said lift-producing propellers, wherein the vehicle is a vertical take-off and landing (VTOL) vehicle; and
   wherein said VTOL vehicle includes a pair of stub wings each moveable between a retracted, stored postion and an extended, deployed postion; and a
   pair of thrust-producing propellers supported on pylons extending upwardly from a rear end of said fuselage, on opposite sides of said longitudinal axis.

11. The vehicle according to claim 10 wherein said thrust producing propellers are located at opposite ends of an adjustable horizontal stabilizer extending between said pylons.

12. The vehicle according to claim 10 further comprising at least two engines, each capable of driving said pair of thrust producing propellers and said at least one lift producing propeller.

13. The vehicle according to claim 10 wherein the vehicle includes a flexible skirt extending below the fuselage enabling the vehicle to be used as a hovercraft for movement over ground or water.

14. A ducted fan vehicle comprising:
   a fuselage having a longitudinal axis and a transverse axis wherein said fuselage includes at least two ducted fans incorporating lift-producing propellers carried within said fuselage respectively on each side of said transverse axis;
   a compartment formed in said fuselage between said lift-producing propellers;
   wherein said fuselage includes two engines, each of said engines capable of driving all of said lift-producing propellers, said two engines being mechanically coupled together in a common transmission system; and
   wherein each of the engines connects to one of the lift-producing propellers via plural gear boxes, and the other of the lift-producing propellers is connected to said two engines via another gear box longitudinally aligned with one of said plural gear boxes, and further comprising a pair of thrust-producing propellers connected to respective ones of said two engines via two of said plural gear boxes connected directly to said engines.

15. The ducted fan vehicle of claim 14 wherein the vehicle includes a flexible skirt extending below the fuselage enabling the vehicle to be used as a hovercraft for movement over ground or water.

16. The ducted fan vehicle of claim 14 wherein said fuselage carries landing gear moveable between extended and retracted positions.

17. The ducted fan vehicle of claim 14 wherein a plurality of vanes extend across an inlet side of each ducted fan.

18. The ducted fan vehicle of claim 17 wherein said plurality of vanes extend substantially parallel to said longitudinal axis.

* * * * *